US00H002080H

(19) United States

(12) Statutory Invention Registration

Bourgeois

(10) Reg. No.: US H2080 H

(43) Published: Sep. 2, 2003

(54) TIMBER PILE CONNECTOR

(76) Inventor: Henry Bourgeois, 5505 Ehret Rd., Marrero, LA (US) 70072

(21) Appl. No.: 10/135,894

(22) Filed: Apr. 22, 2002

(51) Int. Cl.[7] ..... F16B 12/36

(52) U.S. Cl. ..... 403/292; 405/251

(58) Field of Search ..... 403/292; 405/251

(56) References Cited

U.S. PATENT DOCUMENTS

| | | | | | |
|---|---|---|---|---|---|
| 1,073,614 | A | * | 9/1913 | McDearmid | 405/251 |
| 3,307,362 | A | * | 3/1967 | Cravens et al. | 405/251 |
| 3,802,206 | A | * | 4/1974 | Moore et al. | 405/251 |
| 4,431,347 | A | * | 2/1984 | Gillen, Jr. | 405/251 |

* cited by examiner

*Primary Examiner*—Michael J. Carone
*Assistant Examiner*—M. Thomson
(74) *Attorney, Agent, or Firm*—Adams & Reese, LLP

(57) ABSTRACT

A timber pile connector for splicing an upper and lower timber pile. Subsequent to driving the lower pile substantially into the ground, the connector is embedded into the exposed face of the lower pile. The upper pile is then coaxially aligned with the lower pile and the embedded connector and driven into the ground. Concurrent with the pile driving process, the connector is embedded into the upper pile. The timber pile connector utilizes a penetration-limiting member to limit the depth of penetration of the connector into the upper and lower timber piles.

1 Claim, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TIMBER PILE CONNECTOR

FIELD OF THE INVENTION

The present invention generally relates to piling and pile driving and more particularly to connectors for splicing timber pile sections so as to prevent lateral movement of adjoining pile sections and to evenly transfer pile load during the pile driving process.

BACKGROUND OF THE INVENTION

Timber piles are often used for transferring load between a building and the underlying earth when soil load bearing pressures are low or unsuitable for building purposes. Because the timber piles are constructed from trees, the length of a particular timber pile is necessarily limited by the height of the tree from which it is constructed. Typically, when timber piles are needed to transfer loads, the length of piling required is far greater than the length of a single timber pile. Therefore, timber piles must be connected together or spliced in order to achieve a desired pile length.

A "Pile Splicer" is the subject of U.S. Pat. No. 3,802,206 issued to Robert Moore, et al. In that patent, a splicing means for connecting wooden piles end to end to make a long pile for the transfer of pile loads to a lower stronger ground is disclosed. The splicer in the patent provides a plate-like, substantially horizontal element adapted to lie between adjacent pile ends. Optional epoxy glue between the upper and lower surfaces can be provided between the element and the upper and lower piles. A central upright dowel member extends above and below the plate-like element driven into each pile element respectively.

U.S. Pat. No. 3,201,834 discloses another design for a splicing device. Like the design in the 3,802,206 patent, the splicing device includes a central spike design to penetrate the upper and lower timber pilings, however, the device in the 3,201,834 patent is design to fit around the periphery of the two mated timber pilings.

A splice element for two wooden utility poles is provided in U.S. Pat. No. 4,032,244. The element would be attached to the flatten top of an existing pole. A projecting center shaft extends from the bracket to be received within mating center bores provided in the utility pole, a wooden extension pole or both. Threaded fasteners and metal straps complete the interconnection between the existing pole and the extension pole.

In U.S. Pat. No. 4,431,347, a composite timber pile system is disclosed. A cylindrical splicing element is employed in conjunction with a displaceable leveling material to effectively transfer pile load across uneven pile surfaces. The 4,431,347 patent utilizes concave indexing dimples to limit the depth of penetration of the splicing element into the upper and lower timber piles.

The prior art devices fail to provide a suitable means for effective transfer of load between two timber piles in a manner which is simple, straightforward, easy to use, easy to field erect, and easy to duplicate. Furthermore, it is desirable that a splicing element be completely prefabricated, in order to reduce the time involved in the pile driving process. Elimination of steps during field erection contributes to the economic efficiency associated with the splicing element.

The inventor conceived of the timber piling connector disclosed herein about five to eight years ago. About three to five years ago, the inventor disclosed the invention to third parties involved in the timber pile driving business. About two to three years ago, third parties started selling the timber pile connector disclosed herein. The inventor has elected to file this statutory invention registration in order to create a public record confirming that the invention is in the public domain.

OBJECTS AND SUMMARY OF THE INVENTION

It is an object of the invention to provide a splicing element for timber piles that prevents lateral misalignment of the timber piles and effectively transfers load equally and evenly.

It is another object of the invention to provide a splicing element for timber piles suitable for complete prefabrication and requiring a minimal time period for field erection.

It is yet another object of the invention to provide a splicing element for timber piles that is simple, straightforward, easy to use, easy to field erect, and easy to duplicate.

These and other objects and advantages of the invention shall become apparent from the following general and preferred description of the invention.

Accordingly, the present invention thus provides a splicing element for timber pilings suitable for complete prefabrication and requiring a minimal time period for field erection. The splicing element is partially embedded into a first and lower timber pile section after the pile section has been driven substantially into the ground. A second timber pile is axially aligned above the first timber pile and embedded splicing element. As the second and upper timber pile is subsequently driven into the ground, the splicing element is concurrently embedded into the second timber pile.

In the preferred embodiment, the splicing element is cylindrical, having a hollow inner bore, and is embedded coaxial to both the first and second timber piles. A flat bar-like penetration-limiting member is displaced approximately midway through the cylindrical splicing element and perpendicular to the vertical axis of the splicing element, as well as both first and second timber piles to limit the depth of penetration of the splicing element into the first and second timber piles.

PREFERRED EMBODIMENTS OF THE INVENTION

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
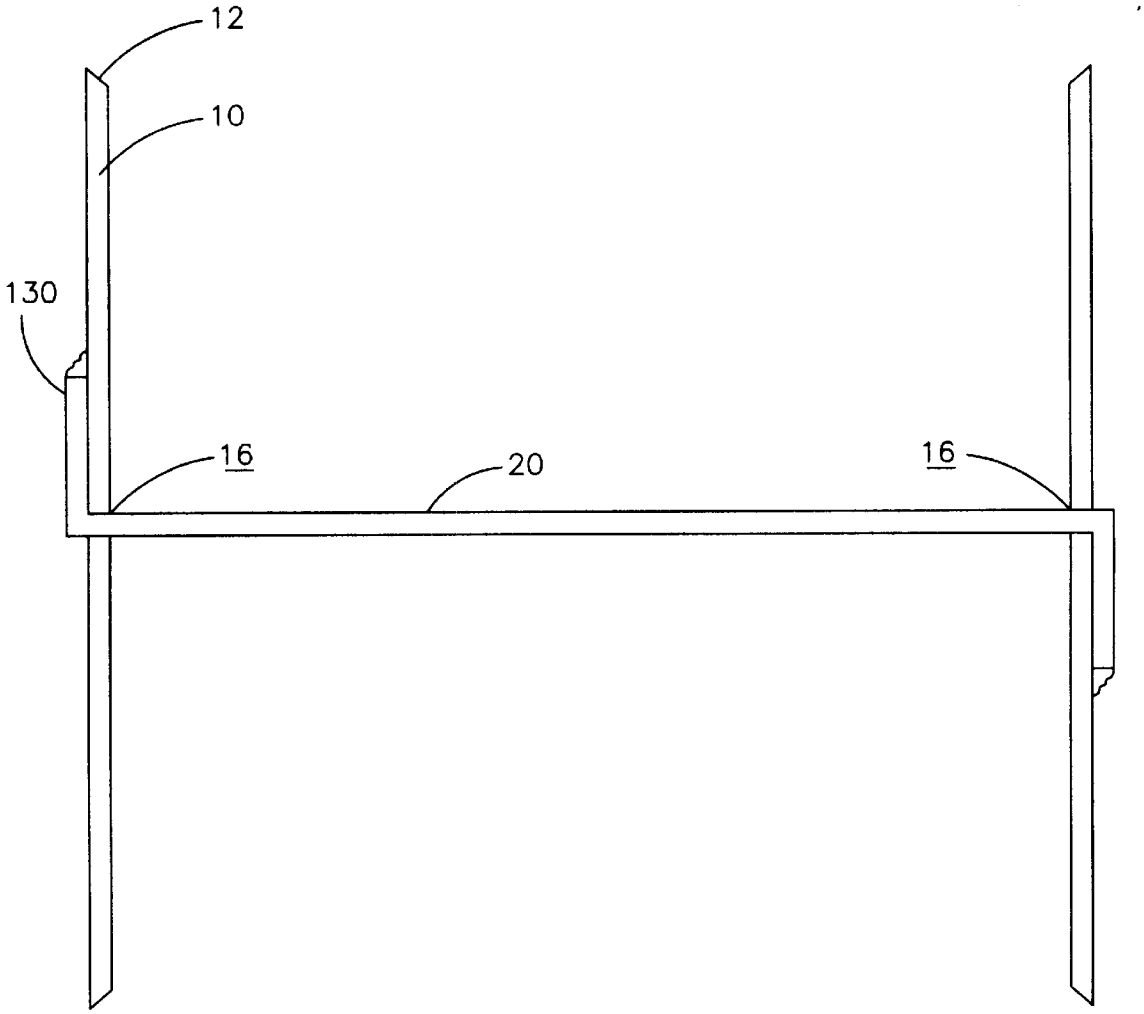
FIG. 1 is a cross-sectional perspective view of the preferred embodiment of a timber pile connector, featuring the penetration-limiting member.

FIG. 1 shows a cylindrical timber pile connector 10. The circumference of the upper and lower rims 12A, 12B of the timber pile connector 10 may be chamfered to improve the connectors ability to penetrate into timber piles. Horizontal slots 16A, 16B are provided through the timber pile connector 10 to provide access for the penetration-limiting member 20. The horizontal slots 16A, 16B are provided such that the penetration-limiting member 20 divides the timber pile connector 10 into substantially equal halves. The penetration-limiting member 20 has a length greater than the diameter of the timber pile connector 10 such that the first and second ends 22A, 22B extend beyond the exterior surface 18 of the timber pile connector 10. As shown in FIG. 1, the first and second ends 22A, 22B of the penetration-limiting member 20 are bent towards and fixedly attached to the exterior surface 18 of the timber pile connector 10. In the preferred embodiment, the first and second ends 22A, 22B are fixedly attached by welds 24A, 24B.

Figure 2:
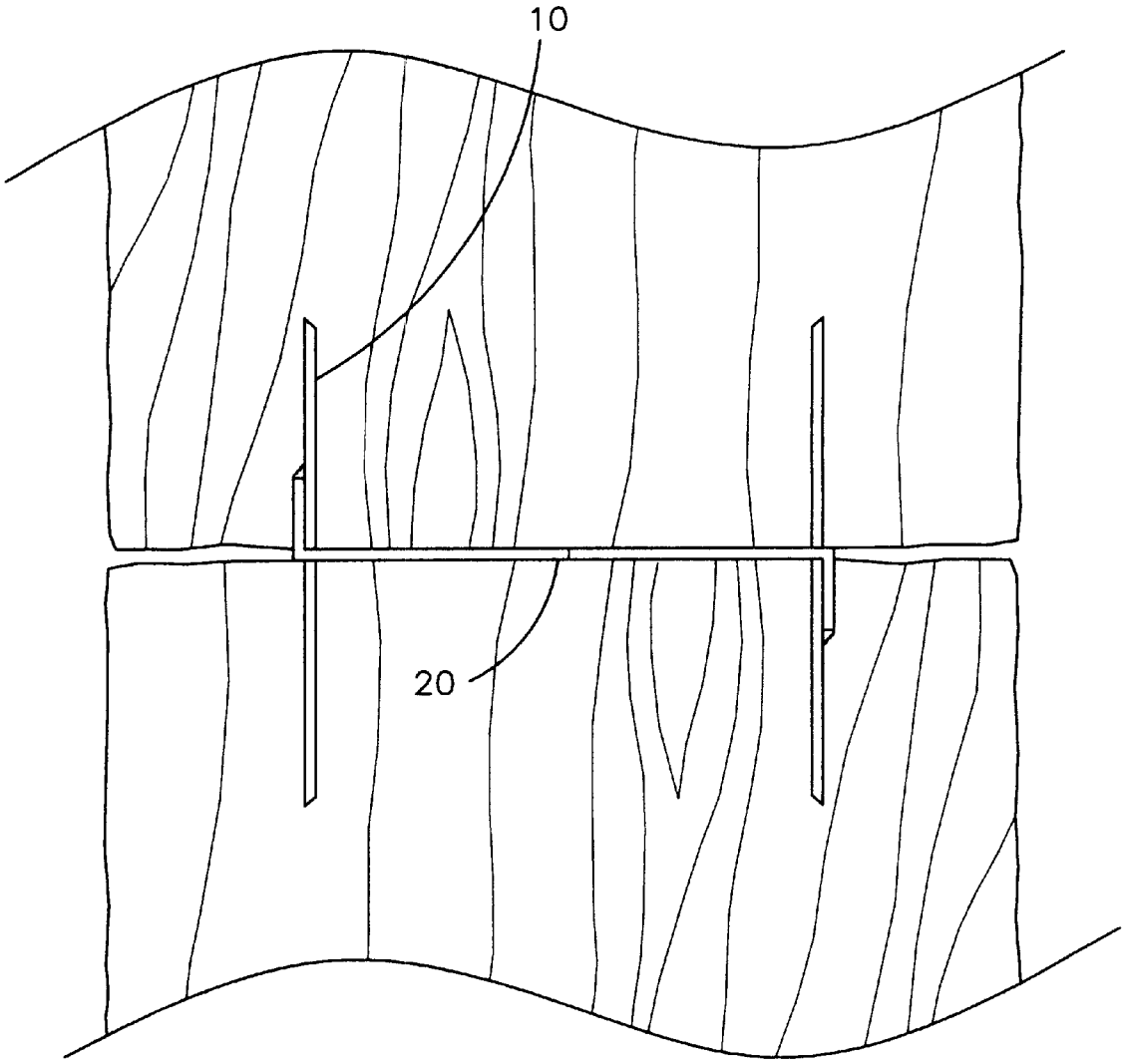
FIG. 2 is a another cross-sectional perspective view of the preferred embodiment of a timber pile connector embedded in a lower and upper timber pile.

In FIG. 2, the timber pile connector 10 is shown in cross-section embedded into a lower timber pile 30 and upper timber pile 32. Note that the penetration-limiting member 20 is in contact with the horizontal face 34 of the lower timber pile 30 and the horizontal face 36 of the upper timber pile 32.

Figure 3:
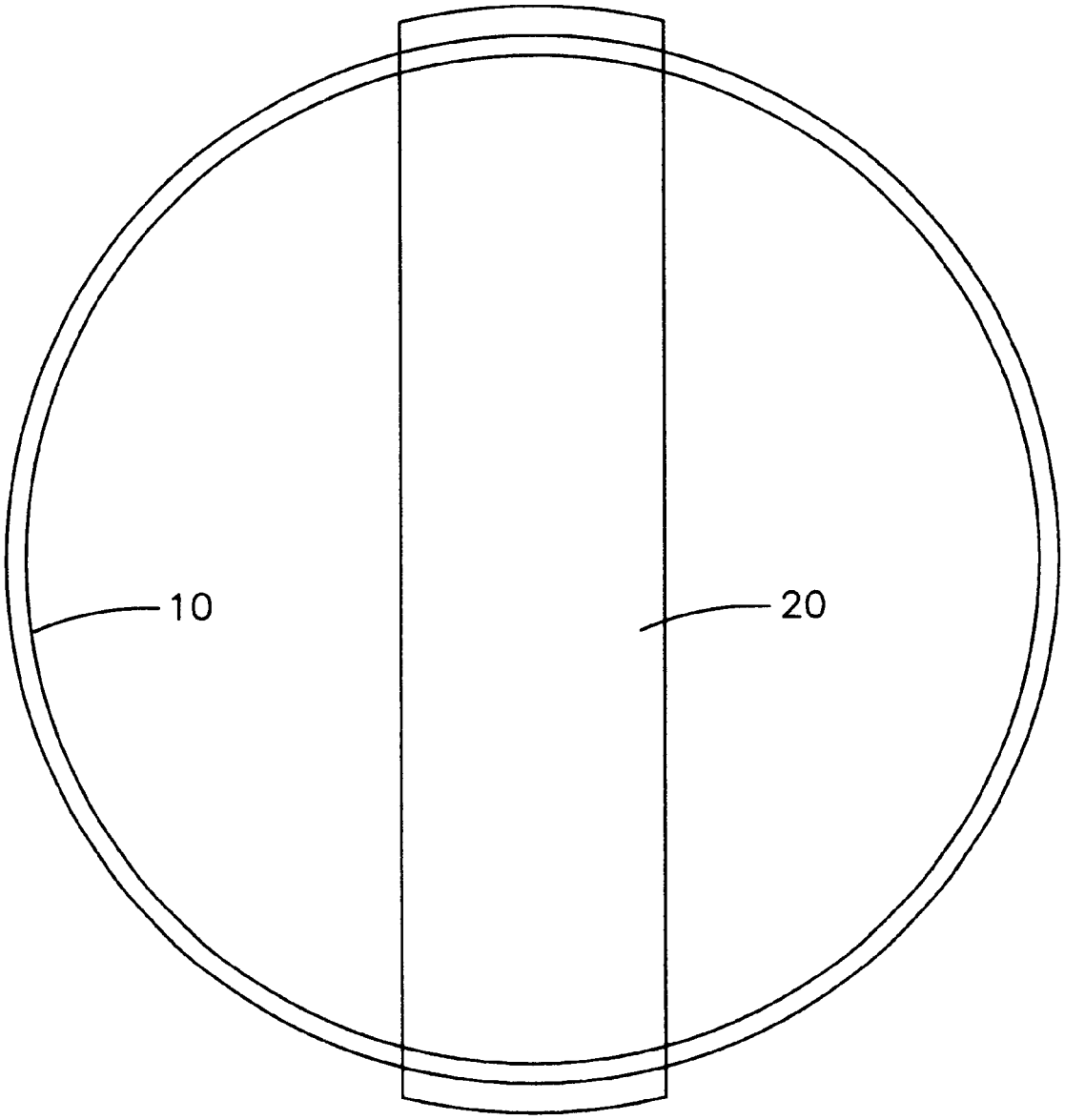
FIG. 3 is a top perspective view of the preferred embodiment of a timber pile connector.

FIG. 3 shows a top perspective view of the timber pile connector 10. The penetration-limiting member 20 is shown traversing across a horizontal axis of the timber pile connector 10 dividing the timber pile connector 10 into substantially equal halves.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A timber pile connector for splicing an upper timber pile having a vertical axis, and a lower timber pile having a vertical axis coaxially aligned with the vertical axis of the upper timber pile comprising: a cylindrical splicing element comprising a vertical axis coaxially aligned with the vertical axes of the upper timber pile and the lower timber pile, a horizontal axis substantially perpendicular to said vertical axis of said splicing element, and a circuitous wall defining a bore therewith, said circuitous wall projecting inwardly into the upper timber pile and the lower timber pile, said bore having a cross-sectional area less than a cross sectional area of both the upper timber pile and the lower timber pile; a plurality of horizontal slots projecting through said splicing element displaced along said horizontal axis of said splicing element and substantially halfway along said vertical axis of said splicing element; and a penetration-limiting member displaced through said horizontal slots and fixedly attached to said splicing element.

* * * * *